US010581199B2

(12) United States Patent
Werner et al.

(10) Patent No.: US 10,581,199 B2
(45) Date of Patent: Mar. 3, 2020

(54) GUIDED CABLE PLUGGING IN A NETWORK

(71) Applicant: INTERNATIONAL BUSINESS MACHINES CORPORATION, Armonk, NY (US)

(72) Inventors: John S. Werner, Fishkill, NY (US); Budy D. Notohardjono, Wappingers Falls, NY (US); Robert K. Mullady, Highland, NY (US); Noah Singer, New City, NY (US); Arkadiy O. Tsfasman, Wappingers Falls, NY (US); Daniel J. Kearney, Ulster Park, NY (US); Matteo Cocchini, Long Island City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/442,678

(22) Filed: Jun. 17, 2019

(65) Prior Publication Data

US 2019/0341723 A1   Nov. 7, 2019

Related U.S. Application Data

(63) Continuation of application No. 15/967,781, filed on May 1, 2018, now Pat. No. 10,454,210.

(51) Int. Cl.
*G06T 19/00* (2011.01)
*H01R 13/631* (2006.01)
(Continued)

(52) U.S. Cl.
CPC ....... *H01R 13/631* (2013.01); *G06K 7/10297* (2013.01); *G06K 9/00671* (2013.01);
(Continued)

(58) Field of Classification Search
None
See application file for complete search history.

(56) References Cited

U.S. PATENT DOCUMENTS

| 7,307,408 B2 | 12/2007 | Porcu et al. |
| 7,605,707 B2 | 10/2009 | German et al. |
| (Continued) | | |

FOREIGN PATENT DOCUMENTS

| CA | 3015149 A1 | 2/2019 |
| DE | 102009044140 A1 | 4/2010 |

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

(Continued)

*Primary Examiner* — Robert J Craddock
(74) *Attorney, Agent, or Firm* — Teddi Maranzano, Esq.; Kevin P. Radigan, Esq.; Heslin Rothenberg Farley & Mesiti P.C.

(57) ABSTRACT

Methods, systems and computer program products are provided for facilitating cable plugging in a network by wirelessly reading, by a hand-held mobile device, connector identifying information directly from a tag associated with a cable connector at one end of a cable to be plugged in the network. The hand-held mobile device uses the connector identifying information to ascertain guidance for where to properly plug the cable connector in the network, and based on ascertaining the guidance, an action is performed to assist in properly plugging the cable connector in the network.

20 Claims, 11 Drawing Sheets

(51) Int. Cl.
  *H01R 13/46* (2006.01)
  *G06K 9/00* (2006.01)
  *G06K 7/10* (2006.01)
  *H04W 88/02* (2009.01)

(52) U.S. Cl.
  CPC ......... *G06T 19/006* (2013.01); *H01R 13/465* (2013.01); *H04W 88/02* (2013.01)

(56) References Cited

U.S. PATENT DOCUMENTS

| | | |
|---|---|---|
| 8,643,476 B2 | 2/2014 | Pinn et al. |
| 8,674,823 B1 | 3/2014 | Contario et al. |
| 10,049,276 B1 | 8/2018 | Haper et al. |
| 2006/0277324 A1 | 12/2006 | Aldereguia et al. |
| 2007/0247284 A1 | 10/2007 | Martin et al. |
| 2008/0065874 A1 | 3/2008 | Geissler et al. |
| 2011/0012727 A1 | 1/2011 | Pance et al. |
| 2012/0045928 A1 | 2/2012 | Caveney et al. |
| 2012/0063501 A1 | 3/2012 | Aguren |
| 2013/0181816 A1 | 7/2013 | Carlson, Jr. et al. |
| 2013/0223684 A1 | 8/2013 | Townend et al. |
| 2014/0018697 A1 | 1/2014 | Allison |
| 2014/0111346 A1 | 4/2014 | Pinn et al. |
| 2017/0018274 A1 | 1/2017 | German et al. |
| 2017/0117669 A1 | 4/2017 | Brodsky et al. |
| 2017/0315167 A1 | 11/2017 | Bai et al. |
| 2017/0367212 A1 | 12/2017 | Moore et al. |
| 2018/0006894 A1 | 1/2018 | Power et al. |

OTHER PUBLICATIONS

International Business Machines Corporation (IBM), "z/Architecture Principles of Operation," IBM® Publication No. SA22-7832-10, Eleventh Edition, Mar. 2015, (pp. 1-1732).
International Business Machines Corporation (IBM), "Power ISA™ Version 2.07B," Apr. 9, 2015, (pp. 1-1527).
Youtube, "BMW Augmented Reality," Published Oct. 3, 2007, https://www.youtube.com/watch?v=P9KPJIA5yds.
Hong, et al., "Management Enabling the Future Internet for Changing Business and New Computing Services," 12th Asia-Pacific Network Operations and Management Symposium, APNOMS 2009, Jeju South Korea, Sep. 2009 (pp. 1-568).
Miseikis, et al., "3D Vision Guided Robotic Charging Station for Electric and Plug-in Hybrid Vehicles," arXiv: 1703.05381v1, dated Mar. 15, 2017 (pp. 1-6).
Werner et al., "Cable Plugging Guidance Facility for a Network", U.S. Appl. No. 15/967,798, filed May 1, 2018 (52 pages).
Werner et al., "List of IBM Patents and Patent Applications Treated as Related", U.S. Appl. No. 16/442,678, filed Jun. 17, 2019, dated Jun. 17, 2019 (2 pages).

GUIDED CABLE PLUGGING IN A NETWORK

BACKGROUND

In system networking, such as computer networking, situations exist where a user or operator may be required to plug a large number of cables. For instance, a server network may contain tens or even hundreds, or more, cables to be connected. Even if a user knows where to plug a particular cable, there may be a number of similar cables that have been plugged at a first cable end which would need to be traced back from a second cable end in order to ascertain which particular cable a user may be holding to determine where to plug the second end. Further, if unplugging a particular cable, it may be difficult to know where the other end of the cable is plugged within the computer network. Additionally, situations may exist where a cable is long enough that a user plugging one end of the cable may not be able to see the other end. For instance, cables may span between front and back sides of a computer rack, or between computer racks, or across a data center, or even across separate rooms of a facility, etc., each of which may make tracing a particular cable more difficult and time consuming.

SUMMARY

Certain shortcomings of the prior art are overcome and additional advantages are provided through the provision, in one or more aspects, of a method of facilitating cable plugging in a network. The method includes wirelessly reading, using a hand-held mobile device, connector identifying information directly from a tag associated with a cable connector at one end of a cable to be plugged in the network, and using, by the hand-held mobile device, the connector identifying information to ascertain guidance for where to properly plug the cable connector in the network. Further, the method includes, based on ascertaining the guidance, performing an action to assist in properly plugging the cable connector in the network.

In another aspect, a system of facilitating cable plugging in a network is provided. The system includes a memory, and a processor communicatively coupled to the memory. The system performs a method, which includes receiving, by a hand-held mobile device, wirelessly read connector identifying information directly from a tag associated with a cable connector at one end of a cable to be plugged in the network, and using, by the hand-held mobile device, the connector identifying information to ascertain guidance for where to properly plug the cable connector in the network. Further, the method includes based on ascertaining the guidance, performing an action to assist in properly plugging the cable connector in the network.

In a further aspect, a computer program product is provided for facilitating cable plugging in a network. The computer program product includes a computer-readable storage medium having program instructions embodied therewith. The program instructions are executable by a processor to cause the processor to: receive, by a hand-held mobile device, wirelessly read connector identifying information directly from a tag associated with a cable connector at one end of a cable to be plugged in the network; use, by a hand-held device, the connector identifying information to ascertain guidance for where to properly plug the cable connector in the network; and based on ascertaining the guidance, perform an action to assist in properly plugging the cable connector in the network.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
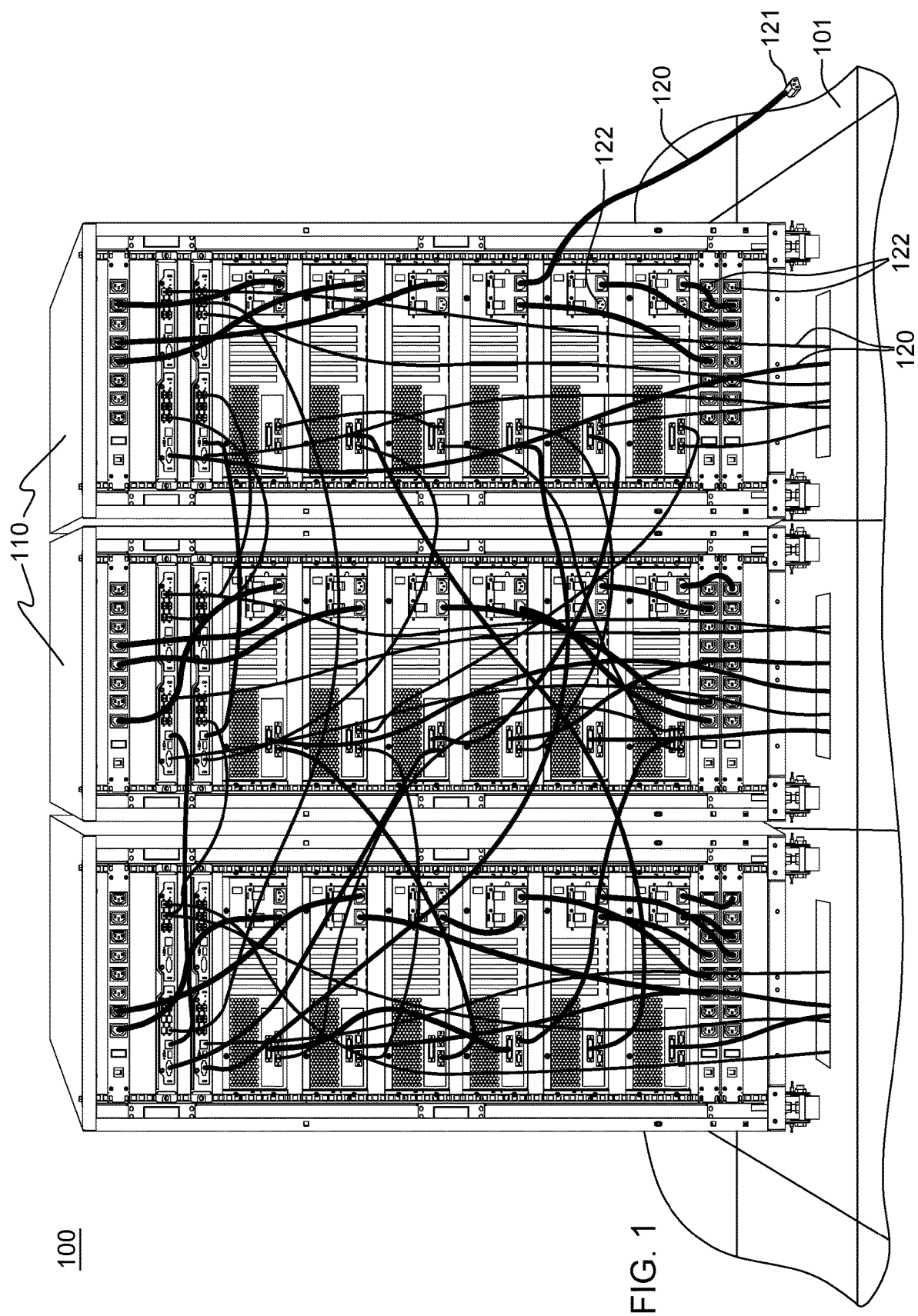
FIG. 1 depicts one embodiment of a computer network with a plurality of cables, and a connector cable to be plugged into the computer network for which guidance is to be provided, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to facilitate, for instance, providing cable plugging guidance for a network.

The illustrative embodiments may be described below using specific code, designs, architectures, protocols, layouts, schematics, or tools only as examples, and are not limited to the illustrative embodiments. Furthermore, the illustrative embodiments may be described in certain instances using particular software, tools, and data processing environments only as example for clarity of description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Networks, such as computer networks, communication networks, and other networks, typically rely on cables to connect product components of the network to one another. Within a network, a user may be required to plug a large number of cables, and even if a user knows where to plug a particular cable, there may be a number of similar cables that have been plugged at a first cable end, which would need to be traced back from a second cable end in order to ascertain which particular cable the user may be holding to determine where to plug the second cable end. Further, situations may exist where a cable is long enough that a user plugging one end of the cable may not be able to see the other end of the cable. For instance, cables may extend between the front and back of a rack, between racks, across a data center, or even span separate rooms of a data center facility, which may make tracing a particular cable difficult and time consuming.

Reference is made below to the drawings, which may not be drawn to scale for ease of understanding, wherein the same reference numbers used throughout different figures designate the same or similar components.

By way of example, FIG. 1 depicts one embodiment of a data center 100 with a plurality of racks 110 of computing equipment. In the example of FIG. 1, datacenter 100 is a raised floor data center, with the plurality of racks 110 residing on a raised floor 101 of data center 100. Note that FIG. 1 may represent a single network, or multiple interconnected networks. Note also that the phrase "network" is used broadly herein to refer to any computer, communications, etc., network or system with two or more product components interconnected by cables. The product components may be any of a variety of components, with a server rack of a data center being one example of a network, or a portion of a network, having a large number of cables to be plugged to achieve a desired setup configuration. The cables may be, for instance, power cables, input/output cables, or other communications cables, etc. Typically, a cable may have a first cable connector at a first end and a second cable connector at a second end. In the example of FIG. 1, multiple cables 120 are shown, each of which has an appropriate cable connector 121 at each end thereof. Further, the product components of the network are shown to have respective plug locations 122 for plugging an appropriate cable into the network to interconnect product components of the network in the desired configuration. Note also that although typically having a single first end and a single second end, a "cable" as used herein may include a configuration with multiple first ends and/or multiple second ends, each having associated therewith a cable connector to be plugged in the network (e.g., a Y-cable).

As can be understood from the depiction of FIG. 1, it may be a time-consuming process to determine for an individual cable 120 where a particular cable connector 121 at one end of the cable should be plugged into the network. This is true whether the other end has been plugged into the network, or not. Further, as noted, depending on where a first plug location is relative to a second plug location within the network, it may be difficult to ascertain where the appropriate plug location is for plugging a particular cable connector. For instance, as shown in FIG. 1, multiple cables may extend from the back of one rack to other locations within the data center, and thus, where, or even whether, the other end of the cable is plugged may sometimes be difficult to ascertain.

Disclosed herein, in one or more aspects, are methods, systems and computer program products which guide cable plugging within a network using, for instance, a mobile device and wireless communication tags, such as near-field communication (NFC) tags, associated with cable connectors at the ends of the cables to be plugged in the network. As is known, NFC tags employ a set of communication protocols that enable an electronic device, such as a mobile device, to establish communication by bringing the device and tag within a set distance of each other. For instance, in one or more implementations, NFC tags may operate at a frequency of 13.56 MHz, and have a read distance of 1-1.5 meters (ISO/IEC 15693), or less. Current NFC tags may have a maximum memory size of about 8 kB, and a maximum transfer rate of about 424 kB/s for reading or writing. Many mobile devices today include NFC technology, which may be used in different settings to transfer information. For instance, in a retail environment, NFC communications may be employed between devices to, for instance, pay a credit card, receive credit for a loyalty program, receive coupons, etc.

Note that although described hereinbelow with reference to NFC communications and NFC tags, near-field communication protocols are one example of a short range wireless communication protocol which may be employed as part of providing cable plugging guidance, in accordance with one or more aspects of the present invention. Those skilled in the art will understand that other short range wireless communication protocols could be employed, such as Bluetooth communications, short range Wi-Fi, radio frequency identification (RFID), etc.

Before discussing implementing cable plugging guidance processing in accordance with one or more aspects of the present invention, mobile devices are briefly described. By way of example, in one or more embodiments, a mobile device may have a wireless communication capability, and be, for instance, a mobile phone, a personal digital assistant (PDA), a wireless computer, a laptop computer, tablet, etc.

The communication capability or system may be, for instance, a Code Division Multiple Access (CDMA) system, a Global System for Mobile Communication (GSM), a Wideband CDMA (W-CDMA) system, a Long-Term Evolution (LTE) system, an LTE Advanced system, etc.

The mobile device may be capable of providing bidirectional communication via a receive path and a transmit path. On the receive path, signals transmitted by another device or tag may be received by an antenna, and provided to a receiver. The receiver conditions and digitizes the receive signals, and provides the conditioned and digitized signals to a digital section of the mobile device for further processing. On a transmit path, a transmitter may receive data to be transmitted from the digital section, and process and condition the data, and generate a modulated signal, which may be transmitted via the antenna to one or more other devices, systems, etc. The receiver and the transmitter are part of the transceiver, and support, for instance, CDMA, GSM, W-CDMA, LTE, LTE Advanced, etc.

The digital section of the mobile device may include various processing, interfaces, and memory units, such as, for example, a modem processor, a reduced instruction set computer/digital signal processor (RISC/DSP), a controller/processor, an internal memory, a generalized audio encoder, a generalized audio decoder, a graphics/display processor, and/or an external bus interface (EBI). The modem processor may perform processing for data transmission and reception, for example, encoding, modulation, demodulation, and decoding. The RISC/DSP may perform general and specialized processing for the wireless device. The controller/processor may control the operation of various processing and interface units within the digital section. The internal memory stores data and/or instructions for various units within the digital section.

A generalized audio encoder performs encoding for input signals from an audio source, a microphone, etc. A generalized audio decoder performs decoding for coded audio data and provides output signals to, for instance, a speaker/headset. It should be noted that the generalized audio encoder and the generalized audio decoder are not necessarily required for interface with the audio source, the microphone, and speaker/headset, and thus, may not be part of the mobile device. The graphics/display processor performs processing for graphics, videos, images, and texts, which are presented to a display unit. The EBI facilitates the transfer of data between the digital section and a main memory. The digital section may be implemented with one or more processors, DSPs, microprocessors, RISCs, etc. The digital section may also be fabricated on one or more application-specific integrated circuits (ASICs), and/or other types of integrated circuits (ICs).

In general, a mobile device such as described herein is indicative of various types of devices, such as a wireless phone, a cellular phone, a laptop computer, a wireless multimedia device, a tablet, a wireless communication personal computer (PC), a PDA, etc. Any such mobile device may have memory for storing instructions and data, as well as hardware, software, and firmware, and/or combinations thereof, which may be used, for instance, to implement one or more aspects of the processing described herein.

In one or more aspects, providing cable plugging guidance as disclosed herein advantageously allows a user to avoid having to lookup instructions to know (for a desired setup) which cable plug should be placed into which plug location of a particular network, resulting in less training potentially being required for what is conventionally a difficult task. Further, using the processes disclosed herein, a user is freed of any need to trace a cable back to an opposite cable end that may already be plugged within the network in order to ascertain where a second cable end is to be plugged. In addition, the processes disclosed herein allow a user to avoid sending power or other signals through a cable to identify both ends of the cable in a case where the cable may run a long distance, such as between rooms. Further, the various process aspects disclosed herein free a user from having to plug a second cable connector of a cable immediately after plugging a first cable connector of the cable, since there is no concern for having multiple second cable connectors grouped together. This may speed up overall time required to complete the network plugging process, or allow a user to take breaks during the plugging process without risk of losing place. Further, the various aspects disclosed herein may allow multiple users to plug multiple cable ends substantially simultaneously. Also, the processes disclosed herein ensure proper plugging of cable connectors in a desired configuration prior to turning on the network setup.

The above-noted advantages, as well as other features and advantages of the invention, are realized through the provision, in one or more aspects, of a method of facilitating cable plugging in a network, which includes wirelessly reading, by a mobile device, connector identifying information from a tag associated with a cable connector at one end of a cable to be plugged in the network. The method includes using, by the mobile device, the cable connector information to ascertain pre-specified guidance for where to properly plug the cable connector in the network. Based on ascertaining the guidance, an action may be performed to assist in properly plugging the cable connector in the network.

In one or more implementations, performing the action may include obtaining, by the mobile device, an image of at least a portion of the network, and superimposing the guidance on the image to assist in plugging the cable connector in the network. In certain embodiments, superimposing the guidance may include providing in augmented reality the guidance superimposed on the image.

In one or more embodiments, the tag may be a passive near-field communication (NFC) tag. Further, wirelessly reading may include powering by the mobile device the NFC tag to read the connector identifying information from the NFC tag. The NFC tag may be located in association with the cable connector at the one end of the cable.

In one or more implementations, using the connector identifying information may include using, by the mobile device, the connector identifying information to obtain from a database containing applicable cable rules, the guidance for where to properly plug the cable connector in the network. Further, the method may include ascertaining the applicable cable rules by imaging, using the mobile device, at least a portion of the network, and determining via image recognition details about the network to identify the applicable cable rules. In one or more embodiments, the cable rules may be stored on the mobile device, while in other implementations the cable rules may be stored remote from the mobile device and remote from the network being connected.

In one or more embodiments, the method may include imaging where the cable connector is subsequently plugged into the network, and maintaining a log identifying, based at least in part on the imaging, which cable connectors are plugged into which plug locations of the network. Further, in certain embodiments, the guidance may include identifying multiple acceptable plug locations for the cable connector in the network. In one or more embodiments, the performing may include providing the guidance on a device separate from the mobile device. For instance, the separate device may include or be smart glasses worn by an operator plugging the cable connector in the network.

In one or more embodiments, the method may include storing an indication of where the cable connector is subsequently plugged into the network, and wirelessly reading, by the mobile device, connector identifying information from another tag associated with another cable connector at another end of the cable to be plugged in the network. The mobile device may then use the stored indication of where the cable connector is plugged into the network, and the connector identifying information from the another tag associated with the another cable connector at the another end of the cable, to ascertain further guidance for where to properly plug the another cable connector in the network. Based on ascertaining the further guidance, a further action may be performed to assist in properly plugging the another cable connector at the another end of the cable in the network. As noted, in certain embodiments, the performing may include obtaining, by the mobile device, an image of at least a portion of the network, and superimposing in augmented reality, the guidance on the image.

Figure 2:
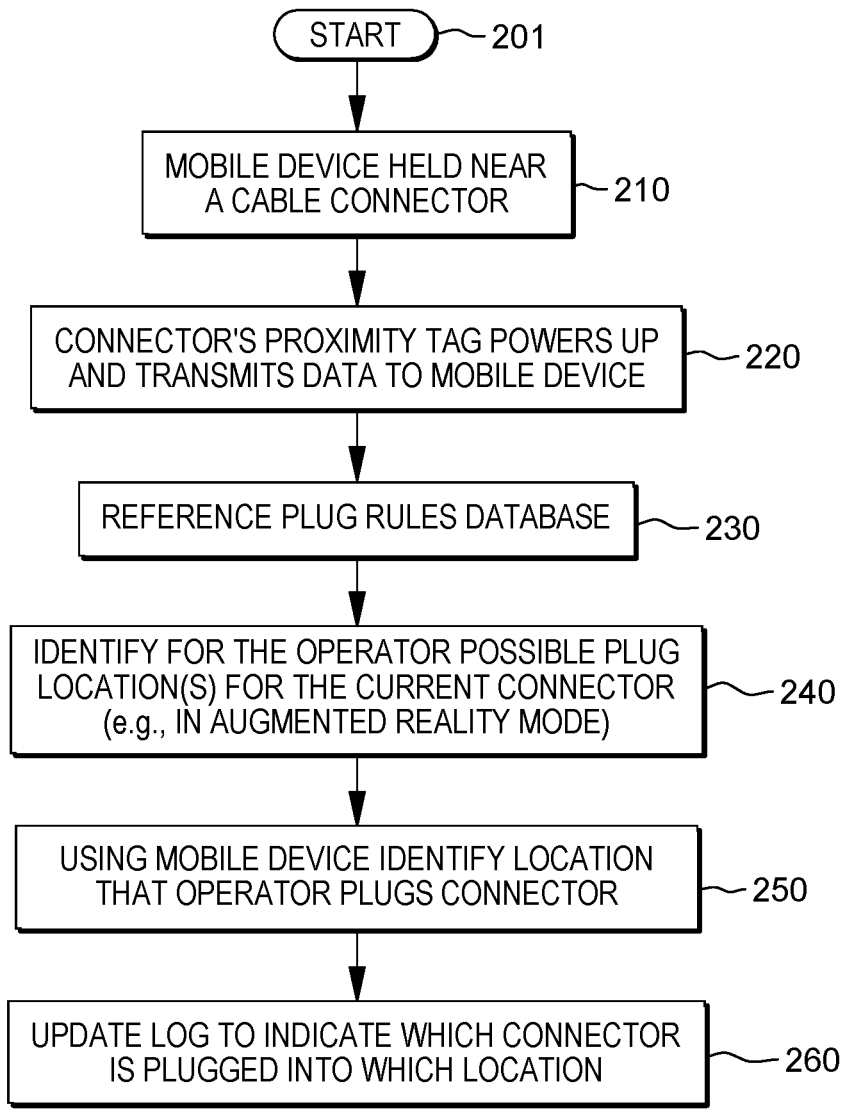
FIG. 2 depicts one embodiment of a process for facilitating cable plugging in a network, in accordance with one or more aspects of the present invention.

FIG. 2 depicts one embodiment of a process 200 for facilitating or assisting a user in cable plugging in a network, in accordance with one or more aspects of the present invention. As illustrated, process 200 begins 201 with a mobile device being brought near a cable connector 210. In one or more embodiments, the cable connector may contain tags, such as NFC tags, associated with the different ends of the cable. For instance, the tags may be incorporated into the cable connectors or physically attached to the cable connectors; that is, assuming that the attachment does not interfere with plugging of the cable connector at an intended plug location within the network. In one or more implementations, the tag may be a passive device, where the device effectively acts as a transponder. Therefore, the process may include powering up the cable connector's associated tag to have the tag transmit data (and in particular, connector identifying information), to the mobile device 220. Once the connector identifying information is obtained from the tag, pre-established plug rules for the desired network configuration may be referenced, such as from a plug rules database 230, to ascertain guidance for where to properly plug the cable connector in the desired network configuration. Based on obtaining the guidance, processing may identify for the user one or more possible plug locations for the current connector (such as in an augmented reality mode) 240. For instance, the mobile device may capture an image of at least a portion of the network and the guidance may be displayed in augmented reality on the image to assist in plugging the cable connector in the network. The mobile device may then be used (e.g., while in augmented reality mode) to identify a location that the user has plugged the cable connector into the network 250. If desired, a notification could be provided in augmented reality on the mobile device where it is detected that the connector is plugged into an incorrect plug location. Also, if multiple plug locations were identified, the mobile device, while in augmented reality mode, facilitates identifying the specific plug location where the connector was plugged. As part of the process, a plug log may be updated and maintained, for future reference, to indicate which cable connector is plugged into which plug location of the network 260.

Figure 3:
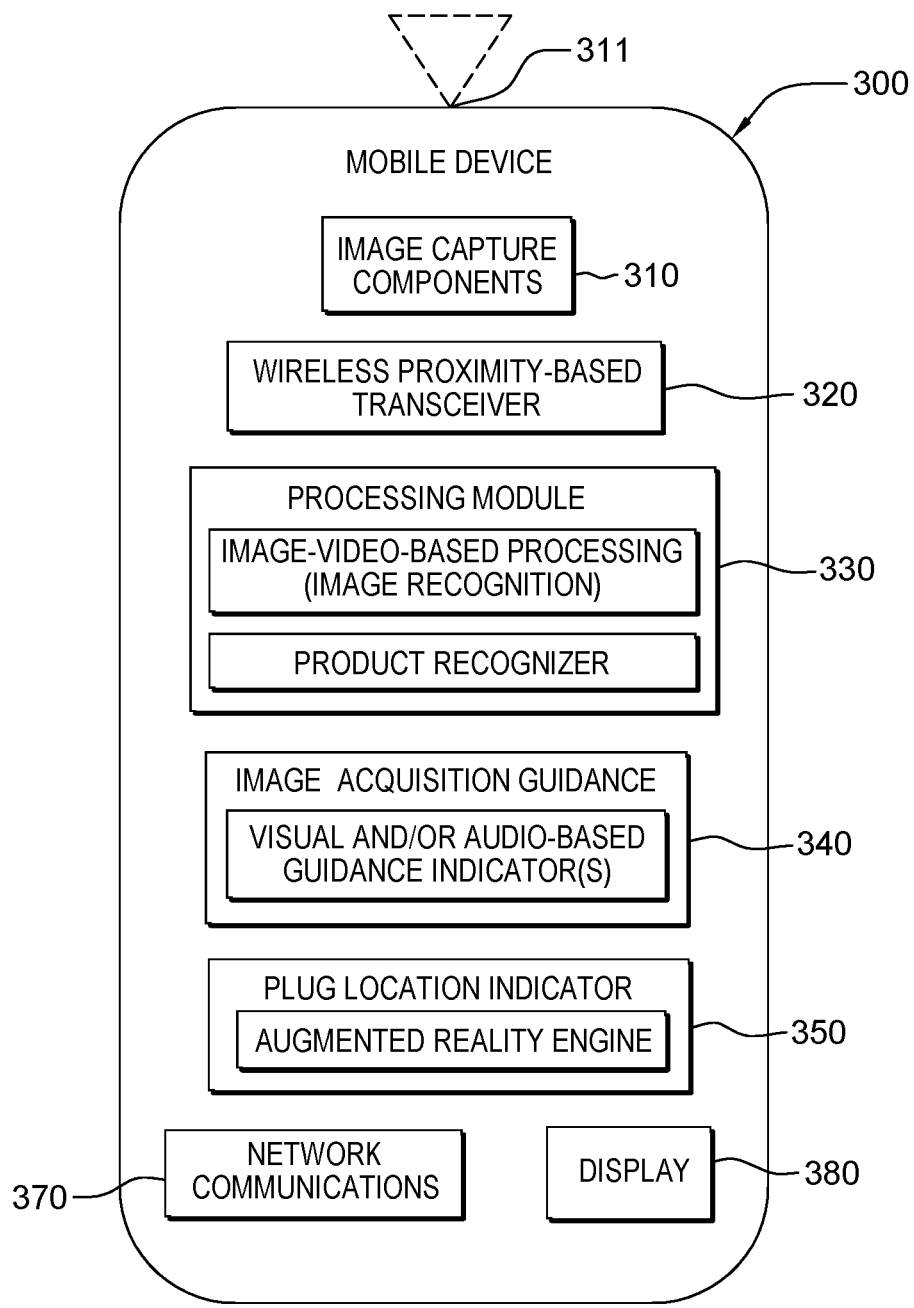
FIG. 3 depicts one embodiment of a mobile device to facilitate providing cable plugging guidance in a network, in accordance with one or more aspects of the present invention.

By way of example, FIG. 3 depicts one conceptual embodiment of a mobile device 300 for use in facilitating cable plugging, in accordance with one or more aspects of the present invention. As shown, mobile device 300 may include image capture components 310, such as conventional image or video camera components (including an image lens 311), as well as wireless, proximity-based transceiver 320, and an image processing module 330, which may include image-video-based processing such as image recognition, in order to implement, for instance, a product recognizer. Further, image acquisition guidance 340 may be provided, which may provide a visual and/or audio-based guidance indicator to a user to direct the user to a proper location in the network for a plug location when, for instance, only a portion of the network is being imaged by the mobile device. Additional components may include processing for plug location indicator 350, which in one or more implementations may include an augmented reality engine, as well as, for instance, network communication capability 370 and a display 380. Note that mobile device 300 may include many additional or different components, modules, subsystems, etc., without departing from the spirit of the present invention.

Figure 4:
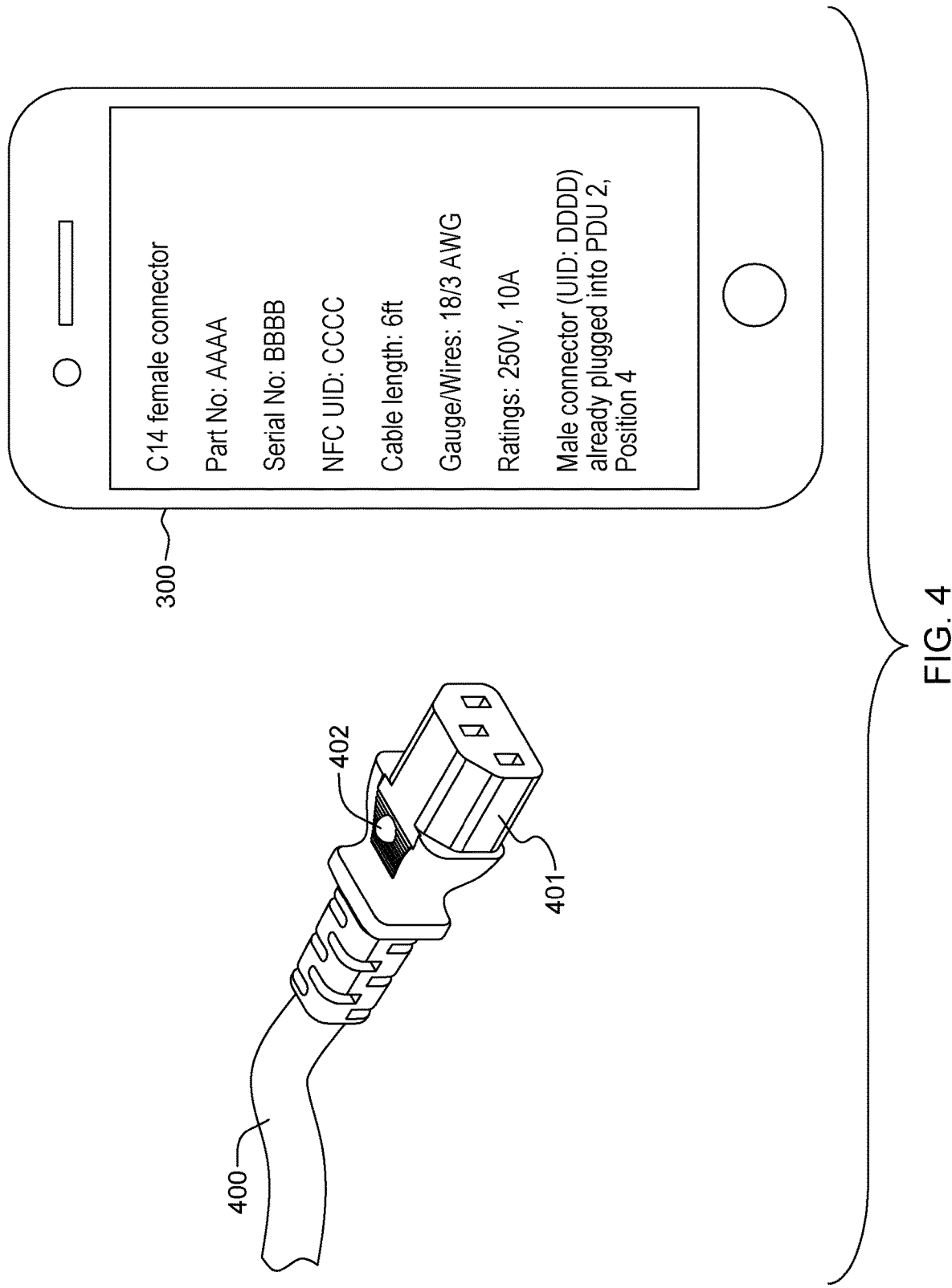
FIG. 4 depicts one embodiment of a mobile device wirelessly reading connector identifying information from a tag associated with a cable connector at one end of a cable to be plugged in a network, in accordance with one or more aspects of the present invention.

As an example, FIG. 4 depicts one embodiment of mobile device 300 powering, and wirelessly reading, connector identifying information from a passive tag 402 associated with a cable connector 401 of a cable 400 to be plugged in a network, such as discussed herein. As noted, in one or more implementations, the tag may be a near-field communication (NFC) tag, and each cable connector at the opposite ends of the cable may have a respective NFC tag associated therewith, each containing appropriate information for that cable connector. The NFC tags may be shielded from the cables, and any circuitry inside the respective cable connectors, such that interference does not occur at NFC frequencies of 13.56 MHz, or NFC harmonics (e.g., 40.68 MHz for a third harmonic, or 67.80 MHz for a fifth harmonic). As noted, the tags may be built into the respective cable connectors, or associated in some way by being physically attached to the cable connectors. Where the tag is an NFC tag, the tag may be a passive NFC tag (as assumed above), in which case, the mobile device powers the tag in order to read data from the tag. In the case where the tag is an active NFC tag, the tag can read and send information, making the tag effectively a transceiver. As noted initially, other wireless communication technologies may alternately be employed. However, a proximity-based method such as NFC is advantageous in an environment where there may be tens or even hundreds of cables, and cable connectors to be plugged into the network may be in close proximity.

In one or more embodiments, the connector identifying information may be stored or programmed into the associated tag, and may include a variety of applicable data. By way of example only, the connector identifying information may include one or more of the tag's unique identification (UID), the type of cable connector the tag is attached to, the type of cable the tag is attached to, a part number, a serial number, wire gage for the cable, a number of conductors, various cable connector attributes, electrical ratings, locations where the connector may be properly plugged in a network, the UID of one or more other connectors attached to the same cable, etc.

Figure 5A:
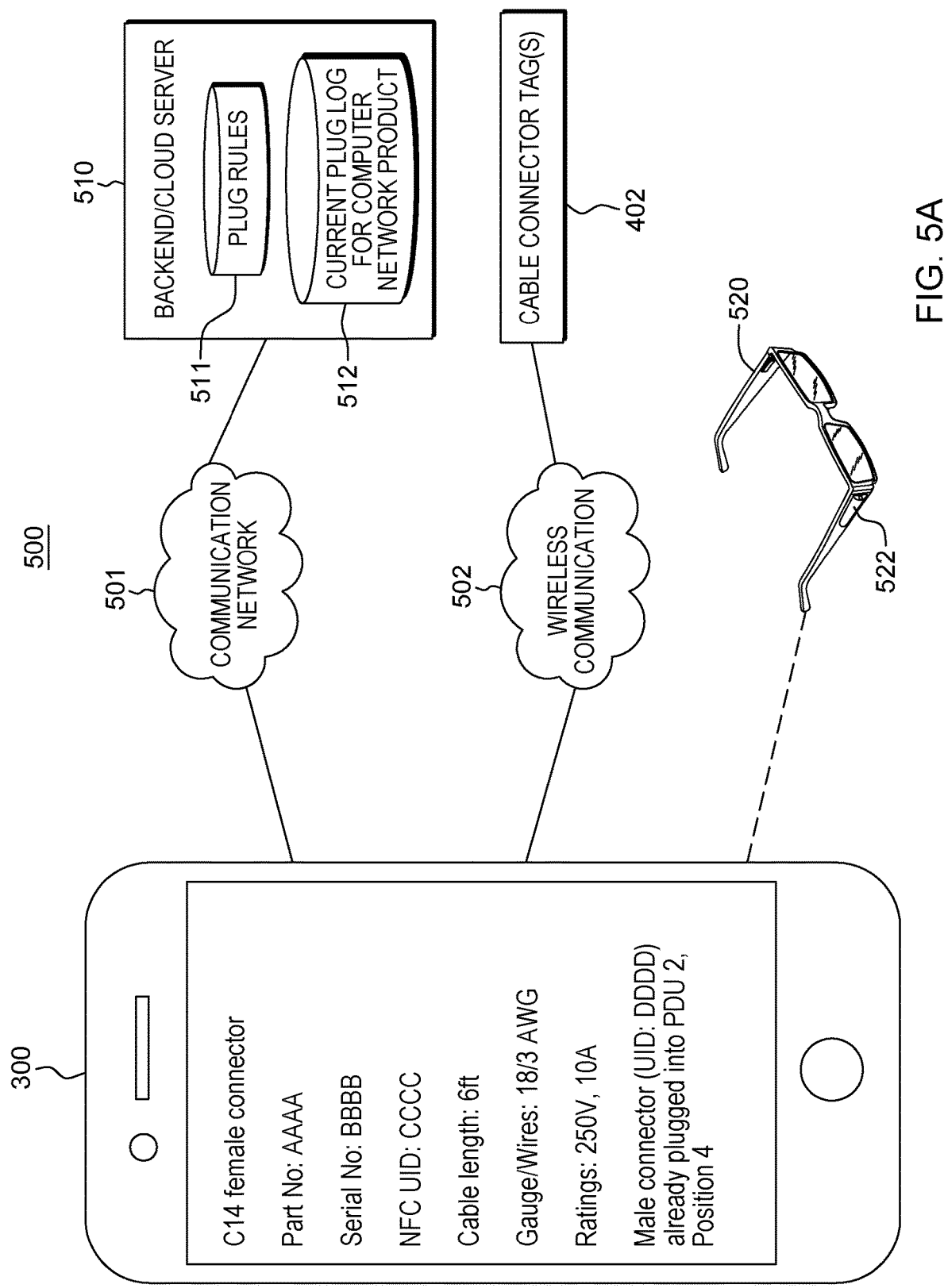
FIG. 5A depicts one embodiment of a system for providing cable plugging guidance, in accordance with one or more aspects of the present invention.

FIG. 5A depicts one embodiment of a system 500 for facilitating cable plugging in a network, such as a computer network, in accordance with one or more aspects of the present invention. System 500 may include one or more mobile devices 300, such as described above in connection with FIG. 3, for wirelessly reading 502 connector identifying information from one or more cable connector tags 402 associated with one or more cable connectors to be plugged in the network (such as described above in connection with FIG. 4). As noted, in operation a user may hold mobile device 300 near a cable connector tag 402 of a cable end, where the tag is a passive tag, the mobile device may emit an electromagnetic field to power the NFC tag, and extract the connector identifying information. In one or more implementations, the tag may communicate the connector identifying information back to the mobile device, where a user could view the data on the mobile device (as shown in FIG. 5A). Where the tag is an active tag, the wirelessly read connector identifying information may be received back at the mobile device, where the user could again view the data, as well as (if desired) store back information on the active tag that, for instance, identifies a day and time that the user handled the particular cable connector, and/or cable.

In one or more embodiments, a user may use mobile device 300 to also connect via a communication network 501 with a remote server 510. Communication network 501 may be any medium used to provide communication links between various devices and computers connected together within a processing environment. For instance, network 501 may include connections, such as wires, wireless communication links, fiber optic cables, etc. In one or more embodiments, network 501 may utilize the Internet, or a different type of network, such as an intranet, a local area network (LAN), a wide area network (WAN), a wireless network, etc.

Server 510 may be implemented as any of a variety of computer systems, such as those described below with reference to FIGS. 8-10. Also, note in this regard that the illustrative aspects described herein may be applied to any of a variety of computing environments. In the example of FIG. 5A, server 510 may be a backend or cloud-based server, and may include a pre-established plug rules database 511, as well as in one or more embodiments, a current plug log for the computer network 512. For instance, in one or more embodiments, the mobile device may include a mobile device application that connects to server 510 to access plug rules database 511, which includes (by way of example) identifying information for the exact cables that plug into each location of the network being set up. By way of example, an exemplary embodiment of a server computer may have plug locations for all the power and communication cables stored in the plug rules database 511 for one or more different system configurations, correct cable lengths, etc. In operation, a user may provide an image of the network, or a portion of the network, and image recognition software, such as the Watson Visual Recognition API, offered by International Business Machine Corporation, of Armonk, N.Y., USA, may perform analysis to determine a current setup of the network, such as a current system configuration and input/output configuration. Using this information, the plug rules database may be referenced. In one or more implementations, the plug rules database may contain all possible setup configurations, and their associated plug rules, or only the specific desired setup may be pre-loaded into the database prior to installation.

Those skilled in the art will note that the pre-specified plug rules for the network configuration may vary depending on how specific a designer wishes to be with cable management. As an example, a network may include a server with multiple input/output drawers, each of which has a physical location associated with each plug location. A cable rule may indicate that a particular type of cable plugs into a particular plug location using, for instance, a reference grid across the face of the frame, the server, or the input/output drawer, etc. In particular, the plug rule may include a physical address of where a particular cable connector is to plug into the computer network. As part of the plug rules, content may be provided to, for instance, suggest to a user that the cable connector just scanned should not be plugged into the network as yet, but rather, that a different cable connector should be scanned.

Also shown in FIG. 5A is another device 520, such as a pair of smart glasses which may be worn by a user plugging the cable connector(s) in the network. As explained herein, based on ascertaining the pre-specified guidance, an action may be performed to assist in properly plugging the cable connector in the network. This action, for instance, may include superimposing on the eye glasses in augmented reality the guidance for directing the operator to properly plug the cable connector in the network. If desired, a camera 522 may also be associated with the smart glasses to assist in capturing an image of the network, or a portion of the network. Note also, in this regard, that device 520, such as smart glasses, could be used in conjunction with mobile device 300 via, for instance, an appropriate wireless communication protocol, or could be used in place of mobile device 300. In such an embodiment, the smart glasses could communicate with server 510 in providing the processes disclosed herein.

Figure 5B:
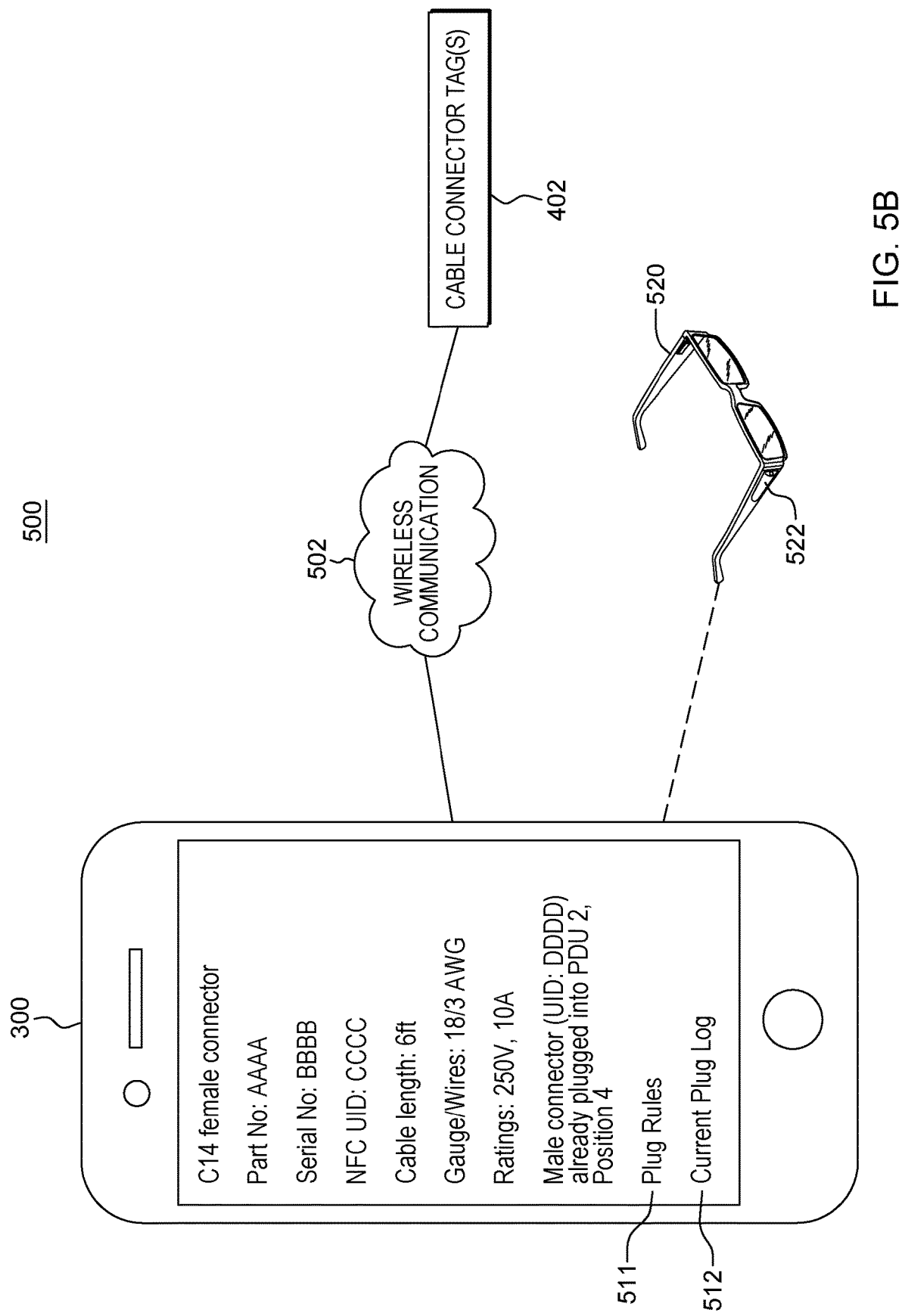
FIG. 5B depicts another embodiment of a system for providing cable plugging guidance, in accordance with one or more aspects of the present invention.

FIG. 5B depicts an alternate embodiment of the system of FIG. 5A. In this embodiment, the plug rules database, as well as the current plug log for the network would be stored on mobile device 300 itself, reducing or eliminating the need for server 510 (FIG. 5A) to perform one or more aspects of the processes described herein. For instance, the plug rules, or plug rules database for a current network setup, may be pre-loaded into mobile device 300 prior to beginning installation of the cables such that communication with a server, (e.g., backend or cloud-based server 510 in the embodiment of FIG. 5A) would not be necessary.

Figure 6:
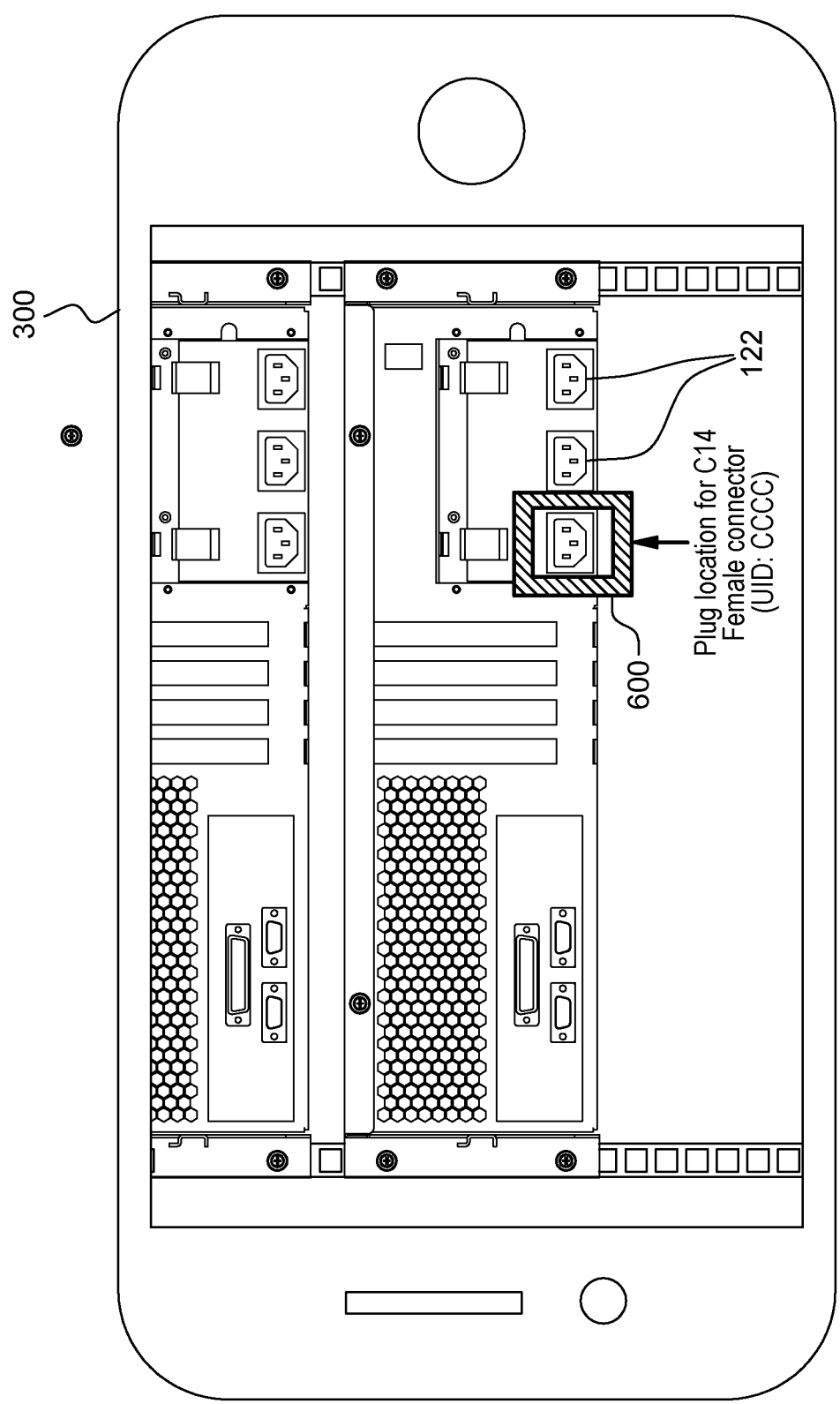
FIG. 6 depicts one embodiment of a mobile device with augmented reality guidance to facilitate properly plugging a cable connector within a computer network, in accordance with one or more aspects of the present invention.

As noted, based on ascertaining the guidance for where to properly plug a particular cable connector, an action may be performed to assist the user in properly plugging the cable connector in the network. An example of this is depicted in FIG. 6, where an image of a computer network, or an image of a portion of a computer network, is displayed on mobile device 300, with the computer network including multiple plug locations 122 in the illustrated image. To assist in plugging the particular cable connector, guidance may be superimposed on the image. For instance, augmented reality guidance 600 may be provided in one or more embodiments. This might include, for instance, superimposing an augmented reality character or object, such as a rectangle or other object, over the particular plug location where the cable connector at issue is to be plugged in the computer network. Further, the guidance may include providing other identifying information superimposed over the image on the mobile device display, such as shown.

Figure 7:
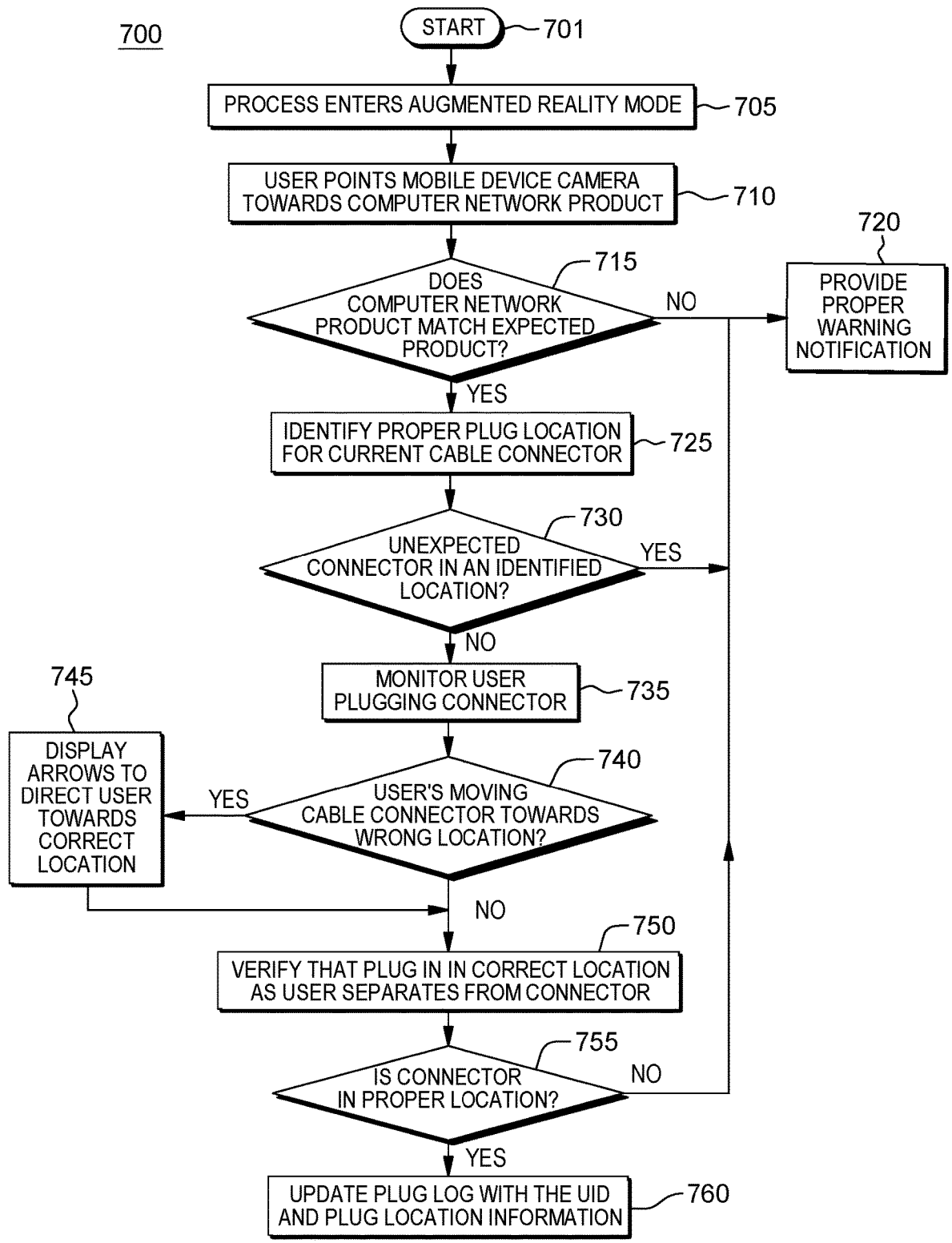
FIG. 7 depicts a further embodiment of a process for facilitating cable plugging in a computer network, in accordance with one or more aspects of the present invention.

By way of further example, FIG. 7 depicts a more detailed embodiment of a process for facilitating cable plugging in a network, such as a computer network, in accordance with one or more aspects of the present invention. The depicted process 700 begins 701, for instance, with entering an augmented reality mode 705 for assisting a user in cable plugging. In the process of FIG. 7, it is assumed that the user has already wirelessly read, using the mobile device, connector identifying information from a tag associated with a cable connector at one end of the cable to be plugged into the computer network, and used the cable identifying information to ascertain the plug rule guidance for where to properly plug the cable connector in the computer network.

As part of assisting proper plugging, the user may point the mobile device camera towards a network component or product at issue 710, and processing determines whether the product being imaged matches the expected product to which the cable connector is to be plugged 715. If "no", then processing provides, for instance, via the mobile device, a proper warning notification 720 to the user to indicate that the user is pointing the mobile device camera towards a different product than needed. Assuming that the computer network product being imaged matches the expected product, then the proper location for the connector cable may be illustrated in augmented reality 725. Note that with the mobile device in augmented reality mode, one or more visual overlays may show where the plug location is that the particular cable connector is to plug into in the network. Other devices may also be used to display in augmented reality mode the plug location. For instance, smart glasses may be used in this context. Note also that multiple options may be shown at this point if the same connector cable may be used in multiple locations. Also, note that where the same cable type is used a number of times within the computer network, and the other end of the connector has not yet been plugged, then if desired, an ordering of the plug locations may be stored in the plug rules, such that the currently given plug location may help to ultimately minimize cable tangling in the resultant computer network. Alternatively, in one or more implementations, an image of the computer network setup, with all the proper plug locations highlighted may also be provided.

In the process of FIG. 7, the image of the network product may also be used to identify whether there is an unexpected connector in a plug location identified for the particular cable connector 730. If "yes", then an appropriate warning notification may be provided to the user 720. For instance, this may represent a case where the user or another operator had previously improperly plugged a cable into the identified plug location contrary to the particular computer network setup configuration specified.

The mobile device camera may also be used to, for instance, monitor where the user is plugging the cable connector 735. For instance, visual recognition software can be employed to provide a notification of whether the cable connector instructions were followed. By monitoring the image or video, processing can determine whether the user is moving the cable connector towards the correct cable location. If the user is moving the cable connector towards the wrong location 740, one or more signals may be provided to the user to redirect the user. For instance, one or more arrows may be displayed on the mobile device to direct, or redirect, the user towards the correct plug location 745. This process may also account for a user scanning one tag associated with one cable connector, putting that cable connector down, and then accidently picking up a different cable connector that is to be plugged in a different cable location. At each step, one or more appropriate warnings may be provided back to the user to assist in properly plugging the cables.

As part of the process, it may be desirable to verify that the cable connector is in the correct plug location as the user separates from the connector 750. Processing may confirm that the connector is in a proper location 755. If "no", then an appropriate warning may be provided back to the user 720. Otherwise, in one or more implementations, the location of the plugged cable connector in the computer network may be logged along with, for instance, the UID of the tag or cable connector, and other information retrieved from the tag associated with the cable connector plugged into the computer network 760. As noted, in certain embodiments, the location of the plugged cable connector may be logged on the mobile device itself, or may be logged on a remote server. Further, the location may be logged on the corresponding tag itself, if the tag is an active tag.

In operation, a user may either repeat the process described herein for another cable, address a warning notification to properly plug the current cable, or repeat the process for a second cable connector of the same cable, that is, if not already plugged. Note that situations may exist where it is more efficient to plug a plurality of first cable connectors of a plurality of cables and bundle the cables together before running them to another location to plug the second connectors of the cables. If a first connector of a cable is already plugged, then the processing disclosed herein may recognize this, for instance, due to the logging noted above, in association with reading connector identifying information from the second cable connectors, that is, from the tags associated with the second cable connectors. In one or more implementations, augmented reality may be employed to show an exact location to plug each second cable connector to ensure proper plugging. Thus, for an exemplary embodiment of a server computer network, proper plugging can be verified without having to power on the system.

Exemplary embodiments of a computing environment which may implement one or more aspects of the present invention are described below with reference to FIGS. 8-10.

Figure 8:
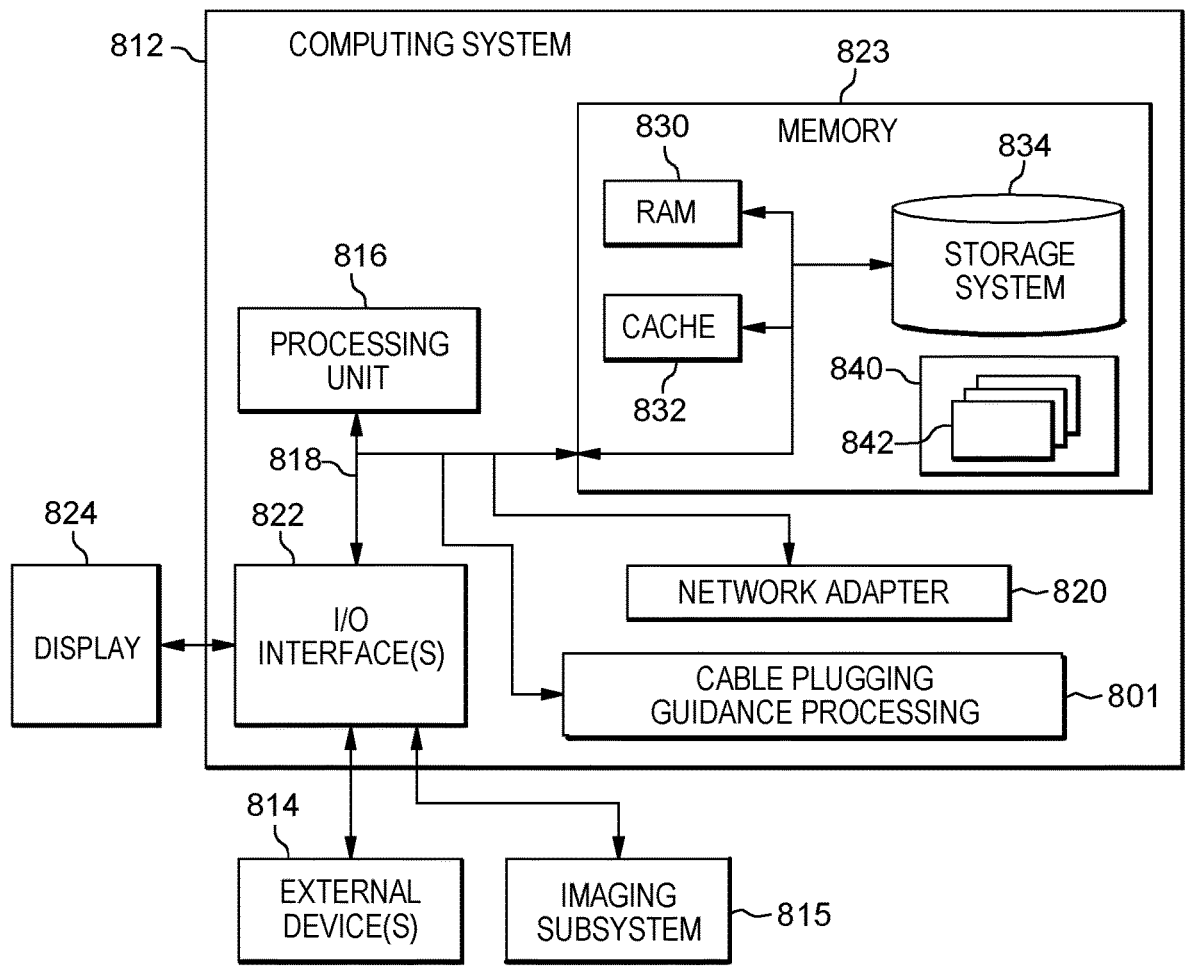
FIG. 8 depicts one embodiment of a computing system which may implement or facilitate implementing cable plugging guidance processing, in accordance with one or more aspects of the present invention.

By way of further example, FIG. 8 depicts one embodiment of a computing environment 800, which includes a computing system 812. Examples of well-known computing systems, environments, and/or configurations that may be suitable for use with computer system 812 include, but are not limited to, a server, a desktop computer, a work station, a mobile device, such as a wireless computer, a handheld or laptop computer or device, a mobile phone, a programmable consumer electronic device, a tablet, a personal digital assistant (PDA), or the like.

Computing system 812 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 8, computing system 812, is shown in the form of a general-purpose computing device. The components of computing system 812 may include, but are not limited to, one or more processors or processing units 816, a system memory 823, and a bus 818 that couples various system components including system memory 823 to processor 816.

In one embodiment, processor 816 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 812 may include a variety of computer system readable media. Such media may be any available media that is accessible by computing system 812, and it includes both volatile and non-volatile media, removable and non-removable media.

System memory 823 can include computer system readable media in the form of volatile memory, such as random access memory (RAM) 830 and/or cache memory 832. Computing system 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 818 by one or more data media interfaces. As described below, memory 823 may include at least one program product having a set (e.g., at least one) of program modules that are configured to carry out the functions of embodiments of the invention.

Program/utility 840, having a set (at least one) of program modules 842, may be stored in memory 823 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein. Alternatively, a separate cable plugging guidance processing system, module, logic, etc., 801 may be provided within computing environment 812.

Computing system 812 may also communicate with one or more external devices 814 such as an imaging subsystem 815, a keyboard, a pointing device, a display 824, etc.; one or more devices that enable a user to interact with computing system 812; and/or any devices (e.g., network card, modem, etc.) that enable computing system 812 to communicate with one or more other computing devices. Such communication can occur via Input/Output (I/O) interfaces 822. Still yet, computing system 812 can communicate with one or more networks such as a local area network (LAN), a general wide area network (WAN), and/or a public network (e.g., the Internet) via network adapter 820. As depicted, network adapter 820 communicates with the other components of computing system, 812, via bus 818. It should be understood that although not shown, other hardware and/or software components could be used in conjunction with computing system 812. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 8. Computing system 812 of FIG. 8 may be practiced in distributed cloud computing environments where tasks are performed by remote processing devices that are linked through a communications network. In a distributed cloud computing environment, program modules may be located in both local and remote computer system storage media including memory storage devices. Computing system 812 is capable of being implemented and/or performing any of the functionality set forth hereinabove.

Figure 9:
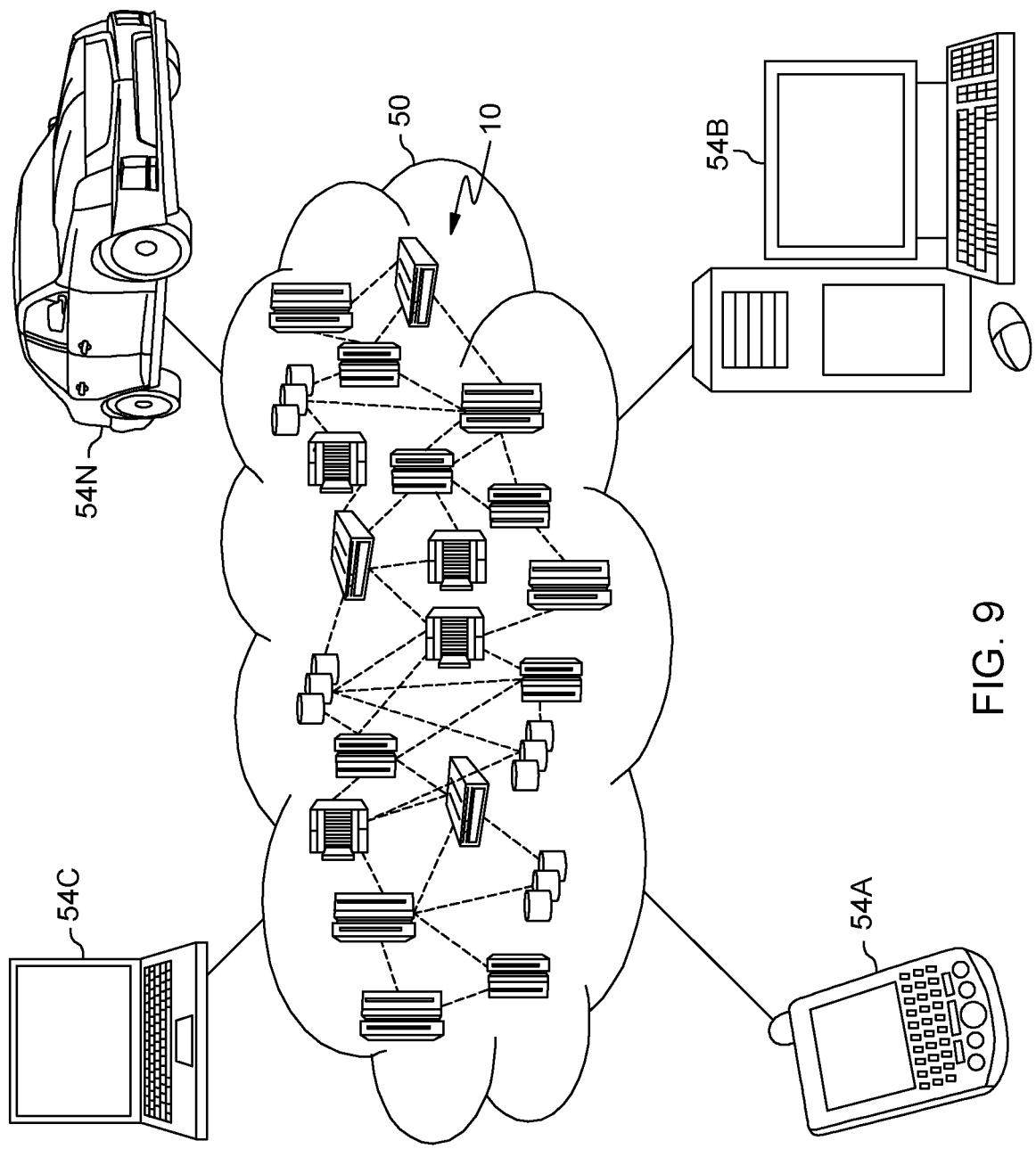
FIG. 9 depicts one embodiment of a cloud computing environment, which may implement, or be used in association with one or more aspects of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 10:
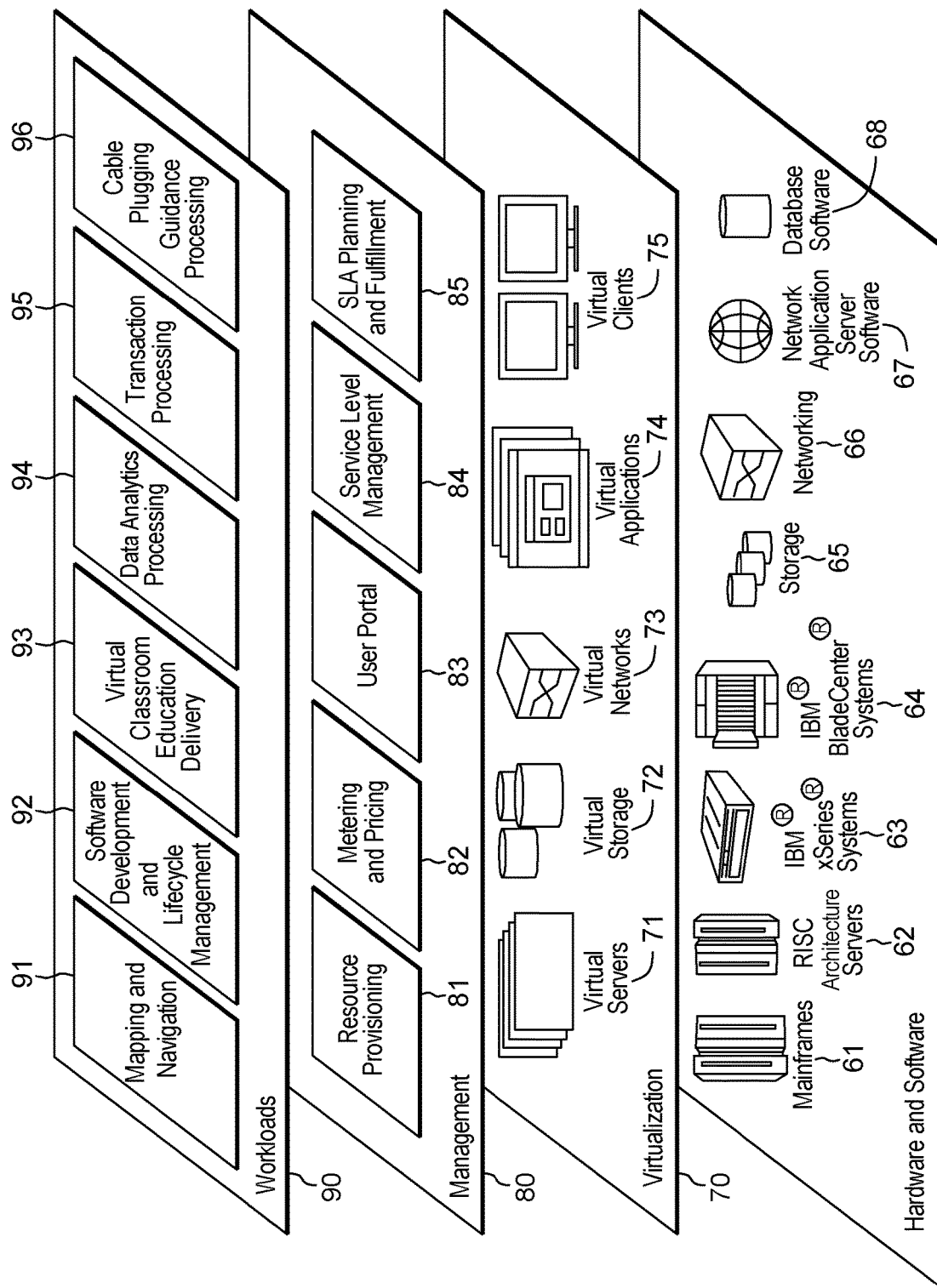
FIG. 10 depicts one example of abstraction model layers, which may facilitate or implement cable plugging guidance processing, in accordance with one or more aspects of the present invention.

Referring to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cable plugging guidance processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of facilitating cable plugging in a network, the method comprising:
   absent plugging a cable connector in the network, wirelessly reading, using a hand-held mobile device, connector identifying information directly from a tag associated with the cable connector at one end of a cable to be plugged in the network, the connector identifying information comprising identifying information specific to the cable connector at the one end of the cable;
   displaying, by the hand-held mobile device, the connector identifying information wirelessly read from the tag associated with the cable connector at the one end of the cable;
   using, by the hand-held mobile device, the connector identifying information to ascertain guidance for where to properly plug the cable connector in the network; and
   based on ascertaining the guidance, performing an action to assist in properly plugging the cable connector in the network.

2. The method of claim 1, wherein the performing comprises obtaining, by the hand-held mobile device, an image of at least a portion of the network and superimposing the guidance on the image to assist in plugging the cable connector in the network.

3. The method of claim 2, wherein superimposing the guidance comprises providing in augmented reality the guidance on the image.

4. The method of claim 1 further comprising bringing, by a user, the hand-held mobile device in wireless communication proximity to the tag associated with the cable connector at the one end of the cable to be plugged in the network.

5. The method of claim 1, wherein the using comprises using, by the hand-held mobile device, the connector identifying information to obtain from a database containing applicable cable rules the guidance for where to properly plug the cable connector in the network.

6. The method of claim 5, further comprising ascertaining the applicable cable rules by imaging, using the hand-held mobile device, at least a portion of the network and determining, via image recognition, details about the network to identify the applicable cable rules.

7. The method of claim 5, wherein the applicable cable rules are stored on the hand-held mobile device.

8. The method of claim 5, wherein the applicable cable rules reside remote from the hand-held mobile device and remote from the network.

9. The method of claim 1, further comprising imaging where the cable connector is subsequently plugged into the network, and maintaining a log identifying, based at least in part on the imaging, which cable connectors are plugged into which plug locations of the network.

10. The method of claim 1, wherein the guidance comprises identifying multiple acceptable plug locations for the cable connector in the network.

11. The method of claim 1, wherein the performing comprises providing the guidance on a device separate from the hand-held mobile device, the device comprising smart glasses worn by an operator plugging the cable connector in the network.

12. The method of claim 1, further comprising:
  storing an indication of where the cable connector is subsequently plugged into the network;
  wirelessly reading, by the hand-held mobile device, connector identifying information from another tag associated with another cable connector at another end of the cable to be plugged in the network;
  using, by the hand-held mobile device, the stored indication of where the cable connector is plugged into the network, and the connector identifying information from the another tag associated with the another cable connector at the another end of the cable, to ascertain further guidance for where to properly plug the another cable connector in the network; and
  based on ascertaining the further guidance, performing a further action to assist in properly plugging the another cable connector at the another end of the cable in the network.

13. The method of claim 12, wherein the performing comprises obtaining, by the hand-held mobile device, an image of at least a portion of the network and superimposing in augmented reality the guidance on the image.

14. A system of facilitating cable plugging in a network, the system comprising:
  a memory; and
  a processor communicatively coupled to the memory, wherein the system performs a method comprising:
    absent plugging a cable connector in the network, receiving, by a hand-held mobile device, wirelessly read connector identifying information directly from a tag associated with the cable connector at one end of a cable to be plugged in the network, the connector identifying information comprising identifying information specific to the cable connector at the one end of the cable;
    displaying, by the hand-held mobile device, the connector identifying information wirelessly read from the tag associated with the cable connector at the one end of the cable;
    using, by the hand-held mobile device, the connector identifying information to ascertain guidance for where to properly plug the cable connector in the network; and
    based on ascertaining the guidance, performing an action to assist in properly plugging the cable connector in the network.

15. The system of claim 14, wherein the performing comprises obtaining, by the hand-held mobile device, an image of at least a portion of the network and superimposing the guidance on the image to assist in plugging the cable connector in the network wherein superimposing the guidance comprises providing in augmented reality the guidance on the image.

16. The system of claim 14, wherein the using comprises using, by the hand-held mobile device, the connector identifying information to obtain from a database containing applicable cable rules the guidance for where to properly plug the cable connector in the network.

17. The system of claim 16, further comprising ascertaining the applicable cable rules by imaging, using the hand-held mobile device, at least a portion of the network and determining, via image recognition, details about the network to identify the applicable cable rules.

18. The system of claim 14, further comprising:
  storing an indication of where the cable connector is subsequently plugged into the network;
  wirelessly reading, by the hand-held mobile device, connector identifying information from another tag associated with another cable connector at another end of the cable to be plugged in the network;
  using, by the hand-held mobile device, the stored indication of where the cable connector is plugged into the network, and the connector identifying information from the another tag associated with the another cable connector at the another end of the cable, to ascertain further guidance for where to properly plug the another cable connector in the network; and
  based on ascertaining the further guidance, performing a further action to assist in properly plugging the another cable connector at the another end of the cable in the network.

19. A computer program product for facilitating cable plugging in a network, the computer program product comprising:
  a computer readable storage medium having program instructions embodied therewith, the program instructions being executable by a processor to cause the processor to:
    absent plugging a cable connector in the network, receive, via a hand-held mobile device, wirelessly read connector identifying information directly from a tag associated with a cable connector at one end of the cable to be plugged in the network, the connector identifying information comprising identifying information specific to the cable connector at the one end of the cable;
    display, by the hand-held mobile device, the connector identifying information wirelessly read from the tag associated with the cable connector at the one end of the cable;
    use, by the hand-held mobile device, the connector identifying information to ascertain guidance for where to properly plug the cable connector in the network; and
    based on ascertaining the guidance, performing an action to assist in properly plugging the cable connector in the network.

20. The computer program product of claim 19, wherein the performing comprises obtaining, by the hand-held mobile device, an image of at least a portion of the network and superimposing in augmented reality the guidance on the image.

* * * * *